INVENTORS
RICHARD C. ESCHENBACH
HARDEN H. TROUE
JOHN R. MILES
BY
ATTORNEY

United States Patent Office 3,524,052
Patented Aug. 11, 1970

---

3,524,052
FAN-FORMING REFLECTIVE OPTICAL SYSTEM
Harden H. Troue and Richard C. Eschenbach, Indianapolis, Ind., and John R. Miles, Elk Grove Village, Ill., assignors to Union Carbide Corporation, a corporation of New York
Filed Apr. 18, 1968, Ser. No. 722,334
Int. Cl. F21v 7/00
U.S. Cl. 240—41.35     8 Claims

ABSTRACT OF THE DISCLOSURE

An illumination optical system for forming a fan-shaped beam of light consisting of an optical assembly having rigidly supported side reflecting surfaces and a contoured cylindrical reflecting member forming in combination a partial enclosure having a substantially rectangular opening through which the generated beam of light emerges. The surfaces provide substantially independent control of the beam divergence in two planes orthogonal to one another.

---

This invention relates to illumination optical systems and more particularly to an improved illumination optical system for generating a relatively narrow high intensity fan shaped beam of light.

Optical systems which can generate a beam of high intensity light have application in night flying aerial photographic reconnaissance and battle field illumination. The light must be concentrated into a well defined channel and develop on the subject area an evenly distributed illumination pattern. Because of weight and space requirements, the efficiency and size of the optical system are essential considerations. In general, as the size of the optics for a given system is reduced its efficiency drops. The efficiency is based upon the relationships between the amount of light confined within the projected beam to the total light energy generated. Heretofore, increased efficiency was achieved by using optical assemblies which were large and unwieldly and which required auxiliary constraints to maintain them properly aligned.

It is therefore a primary object of the present invention to provide an improved illumination optical system which can generate a relatively narrow uniformly distributed fan shaped beam of light.

It is a further object of the present invention to provide an improved illumination optical system which is capable of collecting and distributing substantially 100% of the radiated light from the light source.

It is an even further object of the present invention to provide an optical system which can concentrate the light radiated from the light source into a thin fan shaped high intensity beam of controlled distribution.

It is another object of the present invention to provide an illumination optical system which is highly compact, structurally rigid and of light weight.

In accordance with the present invention unusually high utilization of radiated light is achieved through substantially independent control of the beam divergence in two planes orthogonal to one another.

Other objects, features and advantages of the present invention will become apparent from a reading of the specification and from the accompanying drawings wherein.

The optical system of the present invention, shown in FIGS. 1–4 inclusive of the drawings, is defined by an optical assembly consisting of arcuately contoured walls forming a number of primary active optical surfaces for concentrating and redistributing light energy radiated from a light source confined therein.

Figure 1:
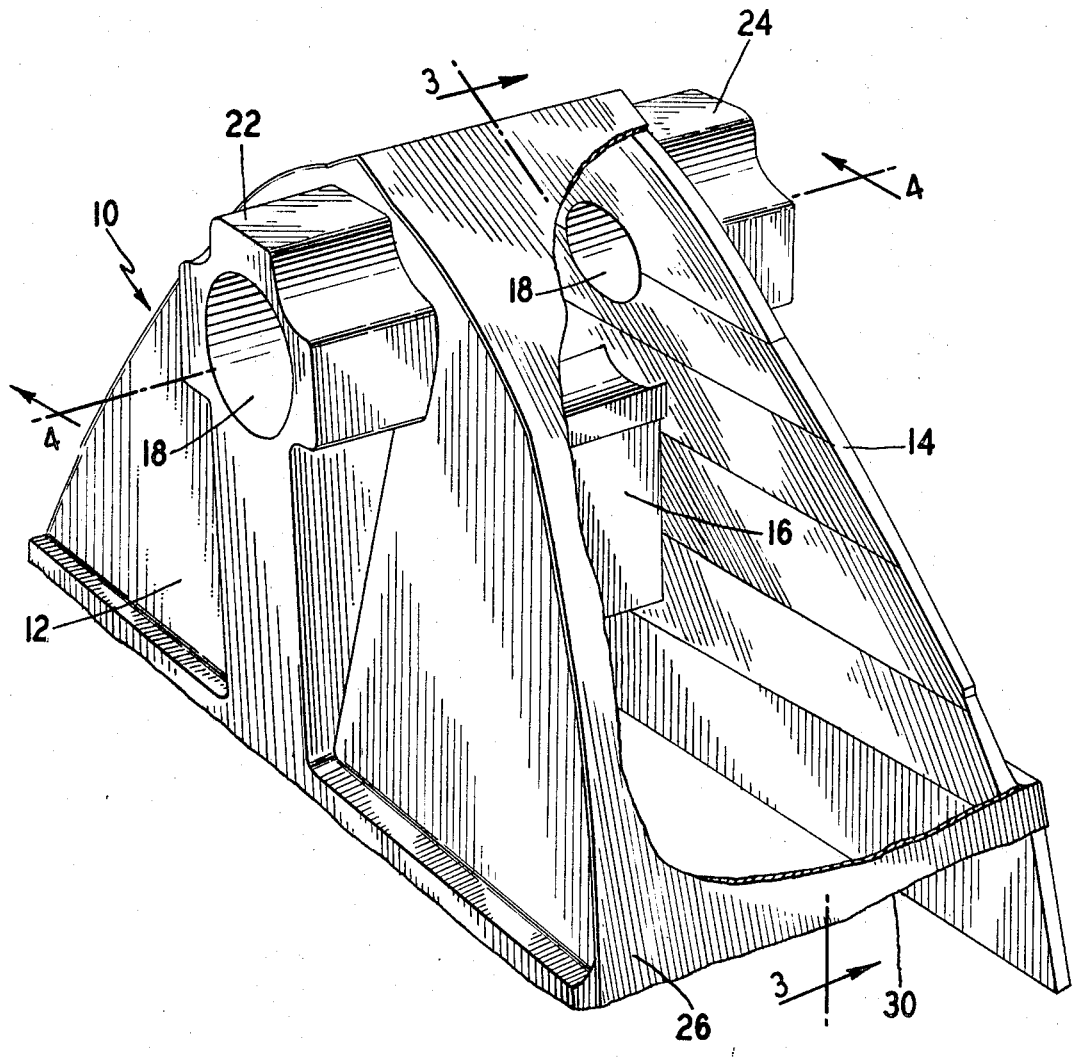
FIG. 1 is a perspective view of the optical assembly of the present invention with the cylindrical parabolic reflecting member partially cut-away and with the light source omitted for illustrative purposes.

The two side walls 12 and 14 of the optical assembly 10 are rigidly supported and spaced from one another by means of a yoke 16 as shown most clearly in FIG. 1. A light source 20 extends through apertures 18, 18 of side walls 12 and 14 respectively where it is fixedly held in position at each end by web-like members 22 and 24. The light source 20 is of the general type wherein an arc is established between a pair of electrodes located at adjacent ends of a transparent chamber 25; the arc being radially confined by means of a swirling gas flow forming thereby a nearly transparent arc of small and uniform diameter. The longitudinal axis of the arc defines the focal line of the optical assembly. The yoke 16 extends from side wall 12 to side wall 14 within the plane of symmetry of the assembly 10 and is positioned forwardly from the light source 20. The plane of symmetry is defined by a plane symmetrically dividing the assembly 10 along the focal line. Yoke 16 has a cylindrically contoured upper surface $c$ concentric with the focal line of optical assembly 10 and positioned contiguous to light source 20.

Figure 2:
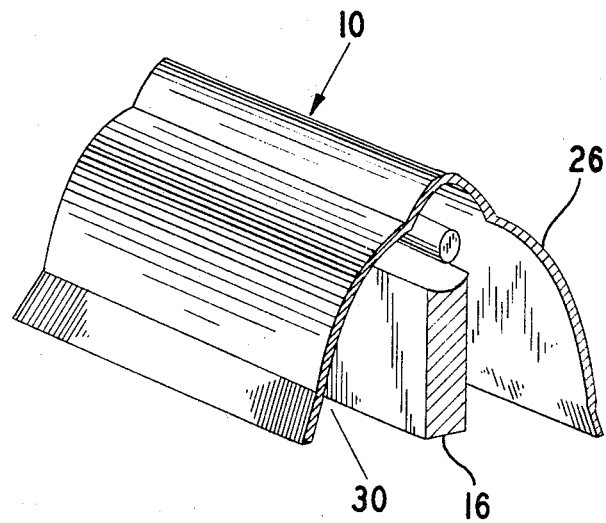
FIG. 2 is another perspective view of the optical assembly illustrating the cylindrical parabolic reflecting member.

A contoured cylindrical optical reflecting member 26 shown most clearly in FIG. 2 is attached to side walls 12 and 14 to form in combination a partial enclosure having a substantially rectangular opening 30 forward of the arc through which the generated beam of light emerges. The term "cylindrical" is used herein in the mathematical sense to refer to a surface generated by a finite straight line moved parallel to itself. Accordingly, the contoured cylindrical optical reflecting member 26 is generated by moving a finite straight line parallel to itself and the focal line of the optical assembly 10.

The cylindrical reflecting member 26 includes two major cylindrically parabolic reflecting surfaces $b$, two minor cylindrically parabolic reflecting surfaces $a$ and two optically flat reflecting surfaces $d$ each being symmetrically disposed about the yoke 16. Minor parabolic surfaces $a$ intersect in the plane of symmetry to form an apex 28 and intersect the major parabolic surfaces $b$ on either side of the plane of symmetry at a distance therefrom equal to approximately one-half the width of yoke 16. The width of yoke 16 is substantially equal to the diameter of the transparent chamber 25 of light source 20.

The two side walls 12 and 14 consist of single reflecting optically flat parallel surfaces $e$ which lie in planes perpendicular to the longitudinal axis of light source 20 and which extend rearward from the longitudinal axis to the apex 28 of the optical assembly 10, and a plurality of non-parallel optically flat reflecting surfaces $f$ disposed at predetermined angles with reference to the longitudinal axis of light source 20. The reflecting surfaces $f$ extend forward from the longitudinal axis to the optics opening 30 of optical assembly 10.

The reflecting surfaces of the optical assembly 10 are designed to collect and redistribute the light energy radiated from light source 20 such that the beam of light exiting optics opening 30 forms a narrow fan-like pattern. The projected fan-like pattern of light is determined by specifying two angles of divergence for the beam. The light beam diverges in two planes oriented perpendicular to each other with respect to the plane of the optics opening 30. The reflecting surfaces are designed to provide substantially independent control for each plane of divergence. For purposes of this disclosure, divergence in a plane parallel to the length of optics opening 30 i.e. parallel to opening 30 of FIG. 3 will hereinafter be referred to as the narrow beam divergence while divergence in a plane parallel to the width of the optics opening 30 i.e. parallel to opening 30 of FIG. 4 will hereinafter be referred to as the wide beam divergence.

The divergence of the projected light in the narrow and wide beam directions are substantially independently controlled by the configured cylindrical reflecting member 26 and side walls 12 and 14 respectively with almost zero second order interaction occurring therebetween.

The maximum angle of divergence for the projected light in the narrow beam direction is approximately equal to the maximum angle subtended by the arc diameter at the closest part of the surface of cylindrical member 26 which occurs at the intersection between surface $a$ and surface $b$. The divergence is then equal to or less than this angle for all parts of the optical system. The two primary variables for changing the angle of divergence in the narrow beam direction are the diameter of the arc and the focal length of the optcal system. These factors are however limited by practical considerations. The focal length of the cylindrical parabolic optics is limited in one extreme by space requirements i.e., the larger the cylindrical member 26, the larger the optical system becomes and the more unwieldly. Conversely, where the cylindrical optics has too short a focal length some of the light rays incident upon the minor parabolic surfaces $a$ will be incapable, upon deflection, of avoiding the transparent chamber 25 of light source 20 causing in turn light refraction and angular dispersion. On the other hand, the arc diameter is controlled by arc radiation source design considerations.

Figure 3:
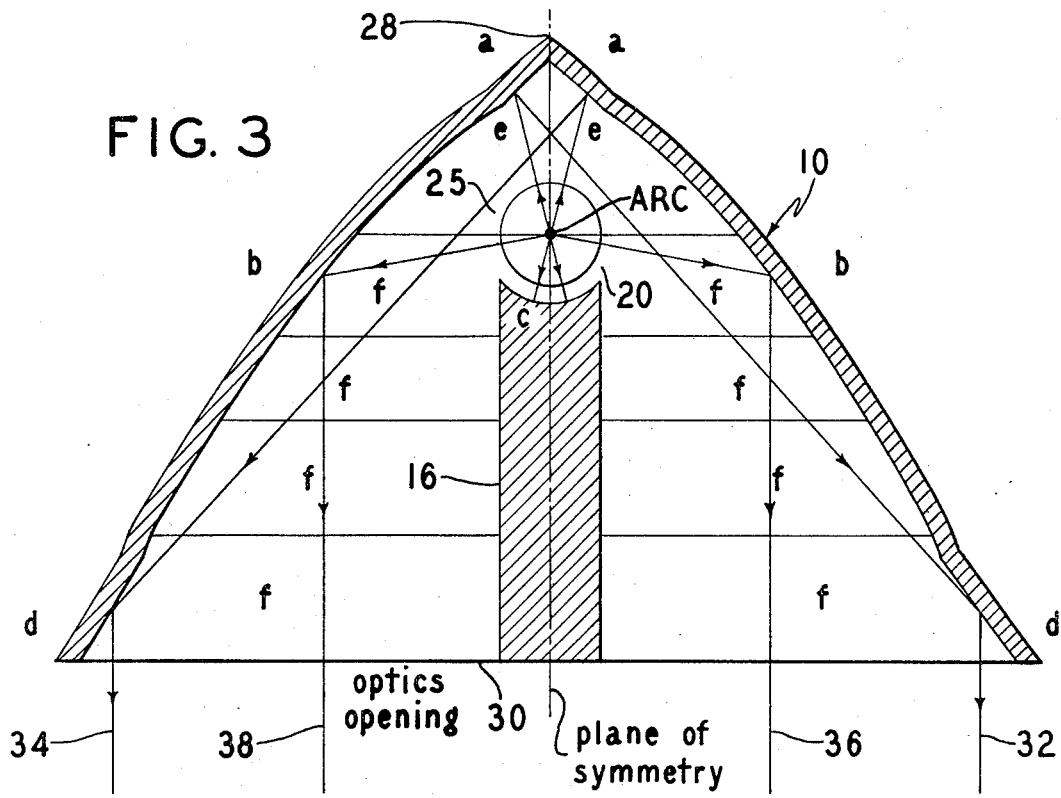
FIG. 3 is a section taken at 3—3 of FIG. 1.

The divergence of the light beam projected from optics opening 30 is controlled, as stated hereinbefore, independently in the narrow and wide beam directions by the reflecting surfaces of the cylindrical member 26 and side walls 12 and 14 respectively. More specifically as shown in FIG. 3 light rays incident on either surface $a$ as can be seen by tracing rays 32 and 34 are reflected in the plane of FIG. 3 at an angle to the plane of symmetry. Optically flat surfaces $d$ are formed to redirect light rays reflected off of surfaces $a$ in a direction substantially parallel to the axis of symmetry. The relationship between the yoke width and focal length is such that light rays traveling from surface $a$ to surface $d$ avoid the transparent envelope 25 of light source 20. Light rays impinging directly upon surfaces $b$ are redirected parallel to the plane of symmetry. This can be seen by tracing rays 36 and 38. Light rays incident upon upper yoke surface $c$ are deflected back through the transparent chamber 25 and through the nearly transparent arc of light source 20 onto surfaces $a$ as if they were initially directed thereon. It should be kept in mind that while the light rays are controlled by surfaces $a$, $b$, $c$ and $d$ such that they emerge from the optical opening 30 substantially parallel to the plane of symmetry in the narrow beam direction they may at the same time be diverging in a plane normal to the plane of symmetry i.e. in the wide beam direction. The optical system of the present invention can provide a controlled angle of narrow beam divergence in the range from ½ to 5 degrees half angle measured from the plane of symmetry in FIG. 3.

Figure 4:
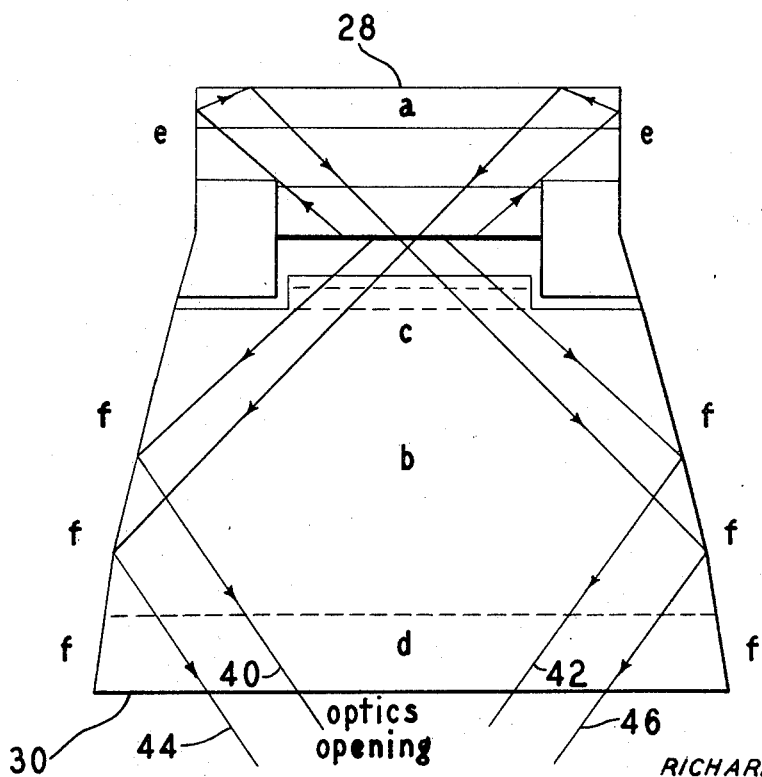
FIG. 4 is a section taken at 4—4 of FIG. 1.

Wide beam divergence is controlled by the reflecting optically flat surfaces of side walls 12 and 14. Each side wall has two optically flat parallel surfaces $e$ and a plurality of short optically flat non-parallel surfaces $f$. Each surface $e$ extends rearward from the arc axis to the apex 28 of the optical assembly 10 and lies in a plane which is perpendicular to the arc axis. The non-parallel optically flat surfaces $f$ lie at a predetermined angle with respect to the arc axis. The optically flat surfaces $f$ may be a single curved surface rather than a series of flat surfaces as long as the generator of this cylindrical surface remains perpendicular to the plane of symmetry. The angle selected between surfaces $f$ and the arc axis determines the degree of divergence in the wide beam direction. A 40° included angle of divergence is established for the geometry shown in FIG. 4. A minimum wide beam divergence of approximately 10 degrees is established when the optically flat side surfaces $f$ are positioned perpendicular to the arc axis. By varying the angle between the optically flat side surfaces $f$ and the arc axis wide beam divergence of up to 60 degrees (30 degree half angle) may be obtained without developing shadows. Light is distributed in the wide beam direction by reflection off of the surfaces $e$ and $f$. As can be seen in FIG. 4 by tracing rays 40, 42, 44 and 46; light rays striking side surfaces $f$ are directly reflected into the beam while light rays reflected off of the surfaces $e$ strike the parabolic surfaces of upper wall 26 and are reflected back onto surfaces $f$ for refocusing into the wide beam divergence direction. It is essential that the surfaces $e$ of side walls 12 and 14 be perpendicular to the arc axis so that images of light rays impinging upon surfaces $e$ remain at the focal line of the parabolic optics. This is to insure that refocused light will be in the narrow beam divergence direction. Similarly, to avoid bending light out of the narrow beam direction for light rays incident upon surface $f$, the intersection of surface $e$ with the first $f$ surface and each successive $f$ surface must be perpendicular to the plane of symmetry. A series of optically flat surfaces substantially as shown in FIG. 4 results in a nearly uniform illumination pattern upon the subject area. Although optically flat surfaces are preferred, other flat or curved surfaces may be used to obtain similar or different light distributions in the wide beam direction.

The size of the fan-shaped illumination pattern upon the ground depends upon the distance the subject area to be illuminated is removed from the plane of the optics opening.

The optical system of the present invention as illustrated in FIGS. 1–4 is limited to wide beam divergence of up to 30 degree half angle. Where a half angle greater than 30 degrees is desired a beam spreader may be incorporated into the system. A beam spreader comprises a number of small flat segmented optical surfaces which accept light which has already been aligned in the narrow beam divergence direction and redirect it in the wide beam divergence direction.

Figure 5:
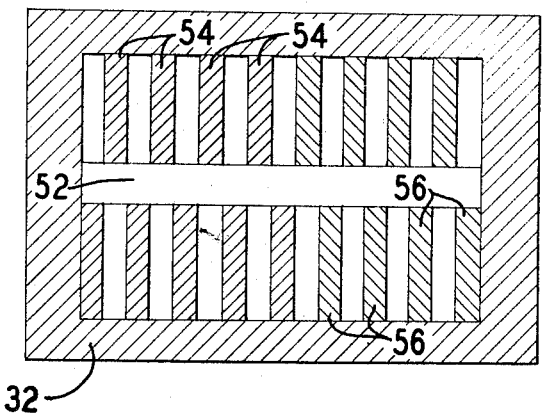
FIG. 5 is a modification of the present invention illustrating a preferred beam spreader.

A preferred beam spreader for increasing the angle of divergence in the wide beam direction is shown in FIG. 5. Plate 48 is fastened by means not shown to exit opening 30 of optical assembly 10 such that the center post 52 is horizontally aligned with yoke 16. The center post 52 divides the beam spreader 50 into two halves. Each half consists of an array of individual short segmented optically flat reflecting surfaces 54 and 56. The angle between the flat surfaces 54 and 56 and the plane of the optics opening 30 determines the degree of divergence for the exiting beam. It is preferred to have each array of reflecting surfaces arranged in a staggered fashion with respect to one another. This gives the impression of a checkerboard when looking into the optical system. The optimum width for the flat optical surfaces is from ½ to ¼ the length of the arc column. This minimizes the effect of shadows. It is to be noted that the center post 52 lies directly beneath the yoke 16 in a dark area as far as the near field is concerned due to the reflecting upper surface $c$ of yoke 16.

Where the beam spreader 50 is to be incorporated into the optical assembly 10 for increasing the angle of wide beam divergence, the side walls 12 and 14 should preferably be aligned prependicular to both the arc axis and the plane of symmetry. If one were to use a contoured side surface from the arc axis forward to the optics opening 30 as shown in FIG. 4 the resulting image of the arc would not be utilized as efficiently because of spreading in the narrow beam direction. Use of flat perpendicular side walls yield well defined specific images which are more readily directed by the beam splitters resulting in higher efficiency and more uniform light distribution. The beam spreader 32 used in conjunction with perpendicular flat side walls can produce wide beam divergences of at least up to 120 degrees.

While the invention has been described in connection with the specific apparatus shown and described, it is apparent that many modifications may be made by those skilled in the art without departing from the underlying scope of the invention. One such modification that may be made would be to substitute a segment of a circular surface for the cylindrical parabolic surface denoted by the letter $a$. This would, of course, require a corresponding change in the generated surface $d$. It is, therefore, intended that the appended claims cover all such modifications which fall within the spirit and scope of the present invention.

What is claimed is:

1. An optical assembly for concentrating and distributing, as a fan-shaped high intensity illumination beam, light energy emitted from an elongated nearly transparent arc of substantially uniform diameter enclosed within a transparent chamber and located axially along the focal line of the optical assembly comprising:
   a pair of side walls each having a first flat reflecting surface normal to the arc axis and at least one second flat reflecting surface at a predetermined angle with respect to the arc axis;
   a yoke extending transversely between said side walls for supporting and spacing said walls a predetermined distance apart, said yoke having a cylindrical reflecting surface concentric with the focal line of the optical assembly; and
   an arcuately contoured reflecting member enclosing the space between said side walls, forming thereby a substantially rectangular optical opening at one end of the assembly.

2. An optical assembly as defined in claim 1 wherein the width of said yoke is substantially equal to the diameter of the transparent chamber.

3. An optical assembly as defined in claim 2 wherein said arcuately contoured reflecting member comprises:
   a pair of major cylindrical parabolic reflecting surfaces having a focal length which is the focal line of the optical assembly;
   a pair of minor cylindrical parabolic reflecting surfaces each having one end thereof intersecting in the plane of symmetry containing the focal line for forming an apex at the end of the optical assembly opposite the optical opening and the other end thereof intersecting the major cylindrical parabolic reflecting surfaces; and
   a pair of optically flat reflecting surfaces each having one end thereof intersecting the major cylindrical parabolic reflecting surfaces and the other end thereof defining the width of the optical opening.

4. An optical assembly as defined in claim 3 wherein the minor cylindrical parabolic surfaces intersect the major cylindrical parabolic surfaces on either side of the plane of symmetry at a distance therefrom equal to approximately one half the width of said yoke.

5. An optical assembly as defined in claim 4 wherein the first flat reflecting surfaces of said side walls lie parallel to one another and extend from the focal line to the apex of the optical assembly.

6. An optical assembly as defined in claim 5 wherein said second flat reflecting surface of each of said side walls intersects the first flat reflecting surface of said side wall associated therewith in a line which is perpendicular to the plane of symmetry and extends from the arc axis to the optical opening.

7. An optical assembly as defined in claim 6 wherein the fan shaped beam of light emerging from the optical opening has a narrow beam divergence in the range from ½ to 5 degrees half angle and a wide beam divergence from 10 to 60 degrees half angle.

8. An optical assembly for concentrating and distributing, as a fan-shaped high intensity illumination beam, light energy emitted from an elongated nearly transparent arc of substantially uniform diameter located axially along the focal line of the optical assembly comprising:
   a pair of parallel side walls each having a single flat reflecting surface which is normal to the arc axis;
   a yoke located along the plane of symmetry of the optical assembly and extending transversely between said side walls for supporting and spacing said walls a predetermined distance apart, said yoke having a cylindrical reflecting surface concentric with the focal line of the optical assembly;
   an arcuately contoured reflecting member enclosing the space between said side walls, forming thereby a substantially rectangular optical opening at one end of the assembly; and
   a beam spreader having a center post in alignment with and in close proximity to said yoke and a plurality of flat segmented optical surfaces extending on either side of said center post at an angle with respect to the plane of the optical opening.

References Cited

UNITED STATES PATENTS

| | | | |
|---|---|---|---|
| 1,153,446 | 9/1915 | Roffy | 240—41.35 |
| 1,711,480 | 4/1929 | Halvorson | 240—103 |
| 2,179,161 | 11/1939 | Rambusch | 240—103 |
| 3,138,333 | 6/1964 | Parsberg | 240—46.01 |
| 3,152,765 | 10/1964 | Wohlers | 240—41.35 |

FOREIGN PATENTS

| | | |
|---|---|---|
| 275,840 | 6/1914 | Germany. |
| 639,884 | 3/1964 | Belgium. |
| 1,074,458 | 7/1967 | Great Britain. |
| 1,156,727 | 11/1963 | Germany. |

NORTON ANSHER, Primary Examiner

R. M. SHEER, Assistant Examiner

U.S. Cl. X.R.

240—41.1, 41.37, 46.01, 103